(12) United States Patent
Lang et al.

(10) Patent No.: US 10,015,322 B2
(45) Date of Patent: Jul. 3, 2018

(54) CREATING RATING REQUESTS FOR GROUPS OF CONSUMPTION ITEMS

(71) Applicants: Georg Lang, Ludwigshafen am Rhein (DE); Christofer Hofsaess, Wiesloch (DE); Artur Kaufmann, Landau (DE); Joerg Luther, Walldorf (DE)

(72) Inventors: Georg Lang, Ludwigshafen am Rhein (DE); Christofer Hofsaess, Wiesloch (DE); Artur Kaufmann, Landau (DE); Joerg Luther, Walldorf (DE)

(73) Assignee: SAP SE, Walldorf (DE)

( * ) Notice: Subject to any disclaimer, the term of this patent is extended or adjusted under 35 U.S.C. 154(b) by 413 days.

(21) Appl. No.: 14/287,452

(22) Filed: May 27, 2014

(65) Prior Publication Data
US 2015/0350458 A1 Dec. 3, 2015

(51) Int. Cl.
*G07B 17/00* (2006.01)
*H04M 15/00* (2006.01)
*H04W 4/24* (2018.01)

(52) U.S. Cl.
CPC ........... *H04M 15/80* (2013.01); *H04M 15/41* (2013.01); *H04M 15/43* (2013.01); *H04M 15/59* (2013.01); *H04M 15/65* (2013.01); *H04M 15/8278* (2013.01); *H04W 4/24* (2013.01); *H04M 2215/0164* (2013.01)

(58) Field of Classification Search
USPC .......................................................... 705/30
See application file for complete search history.

(56) References Cited

U.S. PATENT DOCUMENTS

| | | | |
|---|---|---|---|
| 6,032,132 A * | 2/2000 | Nelson | G06Q 30/04 705/34 |
| 8,666,852 B1 | 3/2014 | Lang et al. | |
| 2004/0064411 A1* | 4/2004 | Tsui | G06Q 20/102 705/40 |
| 2004/0186798 A1* | 9/2004 | Blitch | G06Q 10/087 705/29 |
| 2008/0243655 A1 | 10/2008 | Cai et al. | |
| 2012/0136869 A1 | 3/2012 | Kaufmann et al. | |

(Continued)

FOREIGN PATENT DOCUMENTS

WO WO 2007/002577 1/2007

OTHER PUBLICATIONS

Communication and EESR received from EPO re related EP Application No. 15166535.3-1853 dated Oct. 22, 2015; 4 pages.

(Continued)

*Primary Examiner* — Paul Danneman
(74) *Attorney, Agent, or Firm* — Fish & Richardson P.C.

(57) ABSTRACT

Computer-implemented methods, computer-readable media, and computer systems for processing transactions are described. A provider contract associated with a particular account is identified. In response to determining that the identified provider contract is associated with a periodic activity, a rating request is created that is associated with the particular account. The created rating request associated with the particular account is added to a queue of consumption items for processing, so that the created rating request, when processed, triggers an action corresponding to the determined periodic activity at an external system.

19 Claims, 4 Drawing Sheets

(56) References Cited

U.S. PATENT DOCUMENTS

2013/0046940 A1 2/2013 Kaufmann et al.
2014/0096149 A1 4/2014 Lang et al.

OTHER PUBLICATIONS

SAP—Convergent Billing Software; Monetize value-added services and sustain profit margins—with our convergent charging software; 2 pages <<http://www.sap.com/solution/lob/sales/software/billing-revenue-innovation/monetization.html>> [Retrieved May 27, 2014].
SAP Thought Leadership—White Paper entitled: "*Monetizing Services in the New Hyperconnected World*"; 16 pages pulled from website <<http://www.sap.com/solution/lob/sales/software/billing-revenue-innovation/monetization.html>> [Retrieved May 27, 2014].

* cited by examiner

CREATING RATING REQUESTS FOR GROUPS OF CONSUMPTION ITEMS

TECHNICAL FIELD

The present disclosure relates to computer-implemented methods and systems for processing information.

BACKGROUND

Usage-related transactions, such as consumption items related to telecommunications (e.g., call detail records), may be processed on a per-transaction basis or as a group of transactions related to a particular account and time period. For example, some of the transactions may be rated (e.g., having an assigned price), and the remaining transaction may be unrated. The contract that is associated with a particular customer or entity may stipulate, for example, that the transactions are to be handled in a certain way. For example, some or all of the transactions may apply to fixed-price billing for the account, so that transactions, whether rated or unrated, result in a fixed billing amount for a given time period. Other contracts can speculate that a certain amount of use (e.g., 500 minutes of phone call time) is free (or included in a flat price) under a particular contract option, but transactions exceeding the contracted level of use are to be charged an additional rate. At that end of a billing cycle, for example, a customer can be billed depending on an amount of use and a current contract.

SUMMARY

The disclosure generally describes computer-implemented methods, computer-readable media, and computer systems for processing transactions. As an example, a provider contract associated with a particular account is identified. In response to determining that the identified provider contract is associated with a periodic activity, a rating request is created that is associated with the particular account. The created rating request associated with the particular account is added to a queue of consumption items for processing, so that the created rating request, when processed, triggers an action corresponding to the determined periodic activity at an external system.

The present disclosure relates to computer-implemented methods, computer-readable media, and computer systems for processing transactions. One computer-implemented method includes: identifying a provider contract associated with a particular account; in response to determining that the identified provider contract is associated with a periodic activity, creating a rating request associated with the particular account; and adding the created rating request associated with the particular account to a queue of consumption items for processing, wherein the created rating request, when processed, triggers an action corresponding to the determined periodic activity at an external system.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In particular, one implementation can include all the following features:

In a first aspect, combinable with any of the previous aspects, a consumption item is a telecommunication charge related to call or a message.

In a second aspect, combinable with any of the previous aspects, identifying the provider contract associated with the particular account is performed in response to a mass activity, wherein the mass activity is performed for a plurality of provider contracts or accounts.

In a third aspect, combinable with any of the previous aspects, the mass activity is performed once in a billing cycle.

In a fourth aspect, combinable with any of the previous aspects, processing consumption items includes processing consumption items by rating groups.

In a fifth aspect, combinable with any of the previous aspects, rating requests are associated with a rating request-specific rating group.

In a sixth aspect, combinable with any of the previous aspects, processing a rating request includes triggering actions on the external system, including actions for executing a web service, including to verify information in the consumption items or to access additional information associated with the consumption items or the particular account.

In a seventh aspect, combinable with any of the previous aspects, executing the web service includes connecting the system to contract activation of particular account.

In an eighth aspect, combinable with any of the previous aspects, in response to executing the web service, a new consumption item is received from the external system, and wherein the new received consumption item is processed.

The details of one or more implementations of the subject matter of this specification are set forth in the accompanying drawings and the description below. Other features, aspects, and advantages of the subject matter will become apparent from the description, the drawings, and the claims.

DETAILED DESCRIPTION

Figure 1:
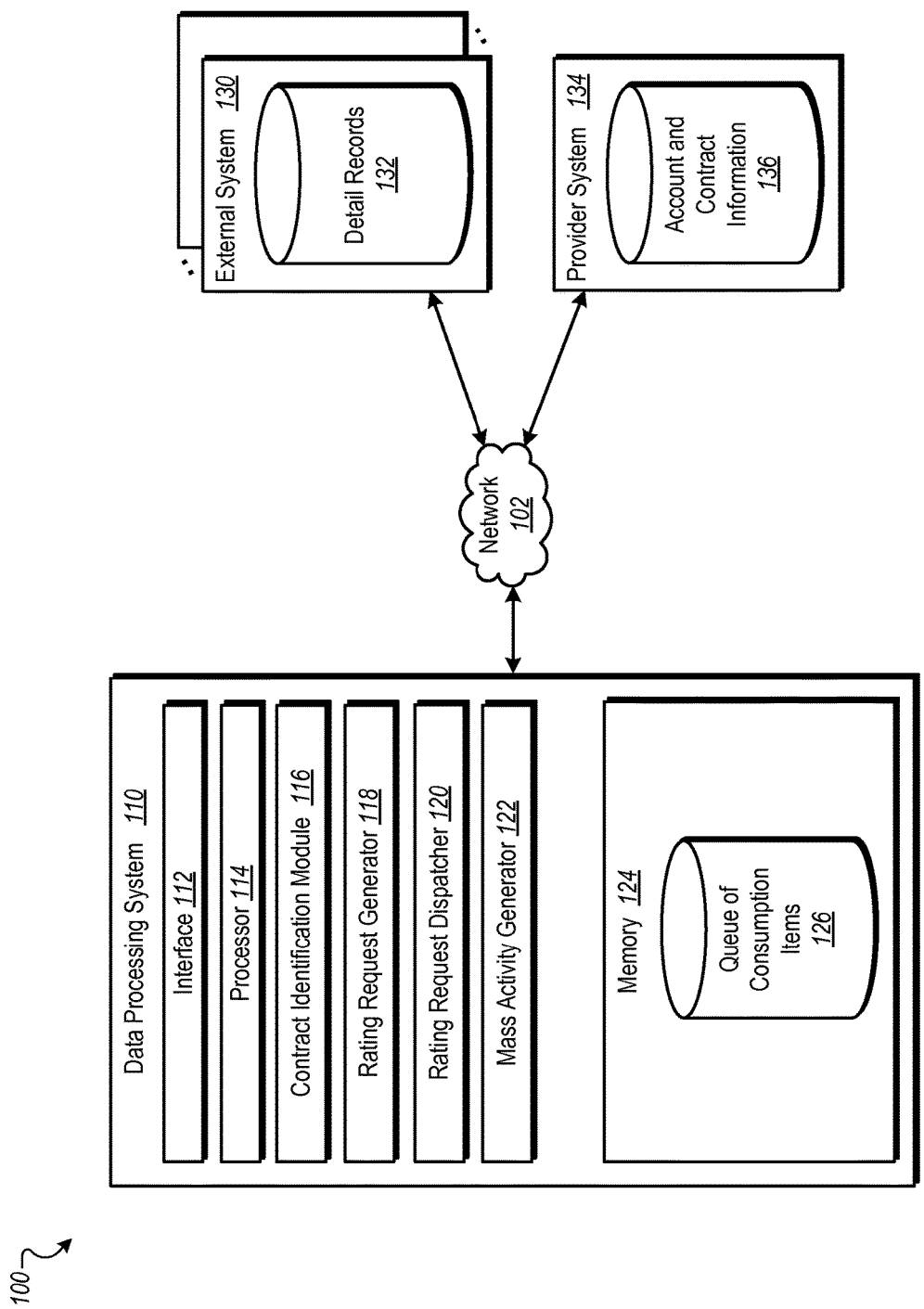
FIG. 1 is a block diagram illustrating an example environment for processing consumption items.

This disclosure generally describes computer-implemented methods, computer-readable media, and computer systems for creating a rating request for use in processing consumption items. The following description is presented to enable any person skilled in the art to practice the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure.

Thus, the present disclosure is not intended to be limited to the described and/or illustrated implementations, but is to be accorded the widest scope consistent with the principles and features disclosed herein.

Rating requests can be used to trigger certain activities in external systems on a periodic basis. For example, a rating request for use in processing call detail records associated with a customer's phone plan can indicate how the call detail records are to be processed. In some implementations, the call detail records and the rating request can be used to generate consumption items, e.g., that are processed for billing purposes. In convergent charging, for example, rating requests can be used to create recurring charges (e.g., for flat-rate contracts or other situations). The usage rating can be based, for example, on counters such as "free minutes per month." In some implementations, the counters can be reset periodically, such as at the end of a period (e.g., the customer's billing cycle). The period until the counters are reset typically ends at the date that the recurring charge is created. For example, if a recurring charge applies for the month of January, then a counter associated with "free minutes" is typically reset at the end of January, or the end of the billing cycle for the applicable customer/account.

In conventional systems, for example, the creation of the recurring charge and the counter reset must be triggered explicitly. For example, the trigger can be: a) a usage event in January that has to be rated or b) a basic scheduler in a convergent charging function that creates the recurring charges for all contracts in the system. However, in computer-implemented methods, computer-readable media, and computer systems described herein, triggers can be automatic. For example, recurring charges and a reset of counter values can occur automatically and in a timely fashion, e.g., before the invoice is issued to the customer, it has to be ensured that the recurring charge has been created. In some implementations, the recurring charge can include an activation date, e.g., that corresponds to the end of a billing cycle.

In some implementations, a mass activity function can create a group of rating requests, e.g., that have the goal of triggering the activation of recurring charges periodically, such as for multiple customers/accounts having the same billing cycle. The rating requests can be created automatically and are connected, and based upon, the activation of contracts. The connection between rating requests and the specific contracts on which they are based facilitates the activation of recurring charges and resetting the counters.

FIG. 1 illustrates an example environment 100 for processing consumption items. Specifically, the illustrated environment 100 includes at least one data processing system 110, including a queue of consumption items 126, and any number of external systems 130, each having remote data records 132 to be processed by the data processing system 110. The environment 100 further includes at least one provider system 134 that includes account and contract information 136. The data processing system 110, the external system(s) 130, and the provider system(s) 134 are communicably coupled using a network 102.

Although FIG. 1 illustrates a single data processing system 110, the environment 100 can be implemented using two or more data processing systems 110, each capable of processing consumption items. The environment 100 can also be implemented using computers, servers, or other components. Indeed, components of the environment 100 may be any computer or processing device. According to some implementations, components of the environment 100 may also include, or be communicably coupled with, an e-mail server, a web server, a caching server, a streaming data server, and/or other suitable server(s). In some implementations, components of the environment 100 may be distributed in different locations and coupled using the network 102.

The data processing system 110 includes an interface 112, a processor 114, a contract identification module 116 for identifying contract information, a rating request generator 118 for generating rating requests, a rating request dispatcher 120 for inserting rating requests into the queue of consumption items 126, a mass activity generator 122, and a memory 124. The interface 112 can be used by the data processing system 110 for communicating with external systems 130 and provider systems 134 in a distributed environment, connected to the network 102, as well as other systems (not illustrated) communicably coupled to the network 102. Generally, the interface 112 comprises logic encoded in software and/or hardware in a suitable combination and operable to communicate with the network 102. More specifically, the interface 112 may comprise software supporting one or more communication protocols associated with communications such that the network 102 or interface's hardware is operable to communicate physical signals within and outside of the illustrated environment 100.

The contract identification module 116, for example, can identify provider contracts for particular user accounts, such as a cell phone contract for a cell phone plan that a customer has with a phone carrier. In some implementations, the provider contract can be identified from account and contract information 136 at the provider system 134 associated with the contract.

The rating request generator 118, for example, can create a rating request that is associated with a particular account. For example, the rating request generator 118 can create a rating request for Customer X that indicates that the detail records for the customer are to be processed in a certain way and at a specific time. The way in which the records are to be processed, for example, can depend on information in the customer's contract, e.g., identified from account and contract information 136. More detailed examples of creating rating requests are provided below with reference to FIGS. 3 and 4. U.S. patent application Ser. No. 14/139,630, entitled "Flexible Rating based on Rating Areas and Rating Groups," which is assigned to the assignee of the present invention and is hereby incorporated by reference, describes methods for generating rating requests.

The rating request dispatcher 120, for example, can add the rating request created by the rating request generator 118 to the queue of consumption items 126 for processing. For example, the rating request can be used to generate a "dummy" or placeholder consumption item, e.g., that is not a detailed record to be processed but rather includes information that designates how consumption items are to be processed.

The mass activity generator 122 can create a mass activity that is set up to process consumption items for multiple customers. For example, the mass activity generator 122 can trigger the generation of rating requests for each of the provider contracts or accounts to be processed in a batch, e.g., for a specific period of time, such as a billing cycle.

The processor 114 can be used by the contract identification module 116, the rating request generator 118, the rating request dispatcher 120, and the mass activity generator 122 to perform their functions. Although illustrated as the single processor 114 in FIG. 1, two or more processors 114 may be used according to particular needs, desires, or particular implementations of the environment 100. Generally, the processor 114 executes instructions and manipulates data to perform the operations of the contract identification module 116, the rating request generator 118, the rating request dispatcher 120, and the mass activity generator 122.

The data processing system 110 also includes the memory 124. Although illustrated as a single memory 124 in FIG. 1, two or more memories 124 may be used according to particular needs, desires, or particular implementations of the environment 100. While memory 124 is illustrated as an integral component of the data processing system 110, in alternative implementations, memory 124 can be external to the data processing system 110 and/or the environment 100. In some implementations, memory 124 includes the queue of consumption items 126.

Figure 2:
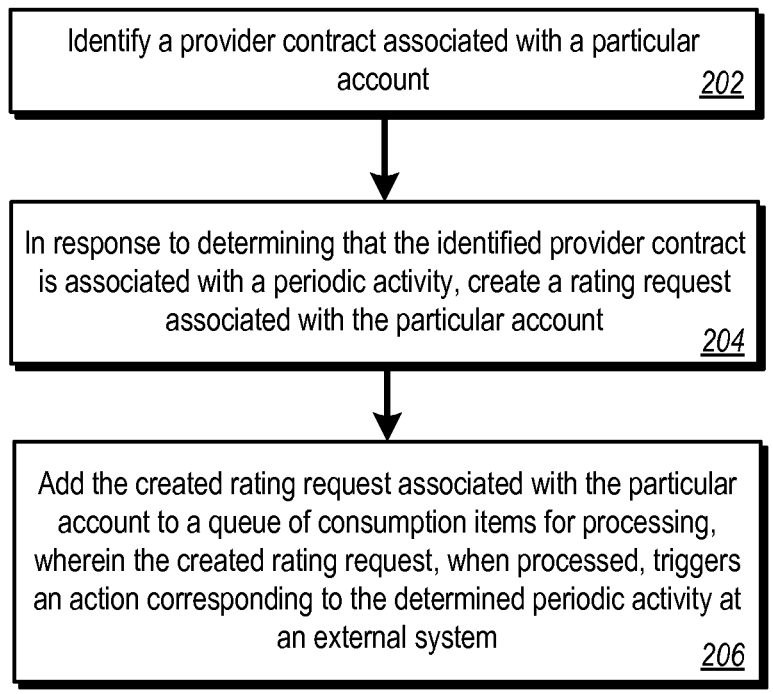
FIG. 2 shows a flowchart of an example method for creating a rating request for use in processing consumption items.

FIG. 2 shows a flowchart of an example method 200 for creating a rating request for use in processing consumption items. For clarity of presentation, the description that follows generally describes method 200 in the context of FIG. 1. However, it will be understood that the method 200 may be performed, for example, by any other suitable system, environment, software, and hardware, or a combination of systems, environments, software, and hardware as appropriate.

At 202, a provider contract associated with a particular account is identified. As an example, the contract identification module 116 can identify a contract for a particular user account, such as a cell phone contract for a cell phone plan that the user has with a phone carrier. In some implementations, the provider contract can be identified from account and contract information 136 at the provider system 134 associated with the contract.

In some implementations, identifying the provider contract associated with the particular account is performed in response to a mass activity, and the mass activity is performed for a plurality of provider contracts or accounts. For example, the mass activity generator 122 can create a mass activity that is set up to process consumption items (e.g., call detail records) for multiple customers. The mass activity, for example, can include processing call detail records for each of the provider contracts or accounts to be included in a batch. The batch processing can be for a specific period of time, a specific number of records, or for another type of grouping of records. In some implementations, the main purpose of a mass activity is the execution of a certain task in a parallel manner (e.g., multi-threaded). For example, execution can occur in batch mode, e.g., an execution without dialog steps and not necessarily using multi-threading.

In some implementations, the mass activity is performed once in a billing cycle. As an example, the mass activity generator 122 can create a mass activity that is to be performed for all customers who have a billing cycle that ends on the same day, or some other group of customers. The mass activity can occur, for example, at month-end, at period-end, or on demand. In another example, the mass activity can be performed daily, and some accounts may be processed on certain days, e.g., on an as-needed basis or near the end of the billing cycle for a customer. In another example, a mass activity can be performed to create rating requests for multiple customers or accounts, where the rating requests correspond to a one-time promotion, discount, event or special purpose. In some implementations, a date-time of the prior generation can be maintained, and a comparison of the current date to the maintained prior generation date-time can be made to determine if another rating request is to be added. In some implementations, a maintained date/time can be used with maintained settings/rules.

At 204, in response to determining that the identified provider contract is associated with a periodic activity, a rating request is created that is associated with the particular account. Creating the rating request, for example, can occur at the appropriate time to prepare the process and generate the rating request. For example, the rating request generator 118 can create a rating request for Customer X that indicates that the detail records for the customer are to be processed in a certain way and at a specific time. The way in which the records are to be processed, for example, can depend on information in the customer's contract. For example, if the contract is a phone carrier contract associated with the customer's cell phone plan, then the contract can indicate that the first 500 minutes are free (e.g., included in a base phone plan at a flat price) and additional calls are to be charged a predetermined per-minute rate. The contract can also indicate that certain types of calls are to be charged (or not charged) differently, e.g., based on time of day, parties (e.g., recipient/caller) involved in the call, the length of the call, the type of plans of the other parties (e.g., whether or not the other parties are in the same network), promotions involved with the customer's plans, group pricing, and/or other aspects of the contract. The rating request can also include information that indicates whether the period is a complete or a partial period, whether the customer is a new or existing customer, and whether the customer is closing the account (e.g., to generate a final bill). In some instances, the rating request can simply be a placeholder that says to trigger an act without details included therein, e.g., to produce consumption items for details associated with the information.

At 206, the created rating request associated with the particular account is added to a queue of consumption items for processing, so that the created rating request, when processed, triggers an action corresponding to the determined periodic activity at an external system. For example, the rating request dispatcher 120 can add the created rating request to the queue of consumption items 126. In some implementations, the rating request can result in the creation of more than one consumption item that is added to the queue of consumption items 126, e.g., to handle complete processing requirements. In some implementations, rating requests that are added to the queue of consumption items 126 can be added so that the rating requests are processed first, e.g., so that the consumption items associated with the rating request will be processed in a certain way.

In some implementations, a consumption item is a telecommunication charge related to call or a message. For example, the consumption items in the queue of consumption items 126 can be call detail records, each one representing a single call or a single text message or some other individual or group of consumption items. Other consumption items are possible, e.g., including songs, videos, pay-per-view movies or other entertainment and/or media, pay-as-you-go items such as data downloads (e.g., Internet usage), or other content or usage.

In some implementations, processing consumption items includes processing consumption items by rating groups. As an example, the processor 114, when processing consumption items from the queue of consumption items 126, can process the consumption items by groups based on how the consumption items are to be processed. For example, one rating group may exist for consumption items that are to allow a customer's first 500 minutes in a billing cycle to be free. Another rating group, for example, can include consumption items that are to be charged solely on the length of a call, the size of a download, or some other metric.

In some implementations, rating requests are associated with a rating request-specific rating group. For example, the rating request generator 118 can create a rating request that is specific to a particular type of contract, e.g., 500 free minutes and 10 cents per minute over the limit.

In some implementations, processing a rating request includes triggering actions on the external system, including actions for executing a web service, including to verify information in the consumption items or to access additional information associated with the consumption items or the particular account. For example, the rating request generator can add information in a rating request so that, when the rating request is processed from the queue of consumption items, the rating request will cause external web services to be accessed to verify information, to obtain addition information to be used during processing, and/or to generate consumption items at the external systems that will later be received at the processing system (e.g., added to a processing queue later).

In some implementations, executing the web service includes connecting the system to contract activation of particular account. Further, executing the web service can cause the contract to be analyzed and any periodic charges/credits/actions to be generated. For example, a call to a web service that occurs during processing of a rating request can cause an account to be accessed, activated, or some other action. As an example, a rating request inserted as a consumption item associated with a phone plan can include an account activation (or some other action) for a non-phone service (e.g., satellite TV, broadband service, long distance service, land lines, etc.) that is bundled with the phone plan for billing purposes.

In some implementations, in response to executing the web service, a new consumption item is received from the external system, and the new received consumption item is processed. For example, information received from the external system can be used by the rating request generator 118 to generate one or more additional consumption items to be added to the queue of consumption items 126, e.g., to be processed immediately or at a later time.

Figure 3:
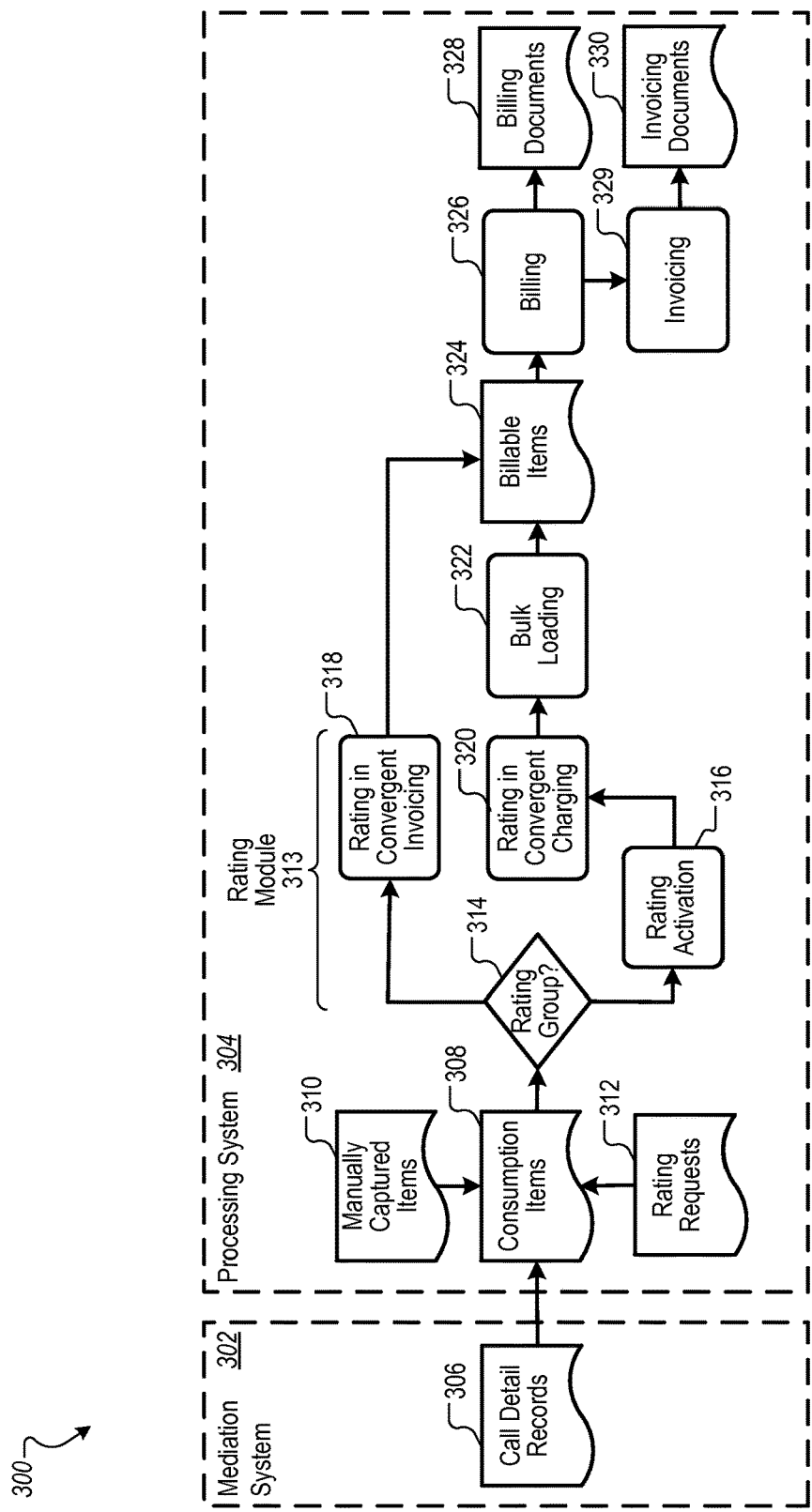
FIG. 3 shows a flowchart of an example process 300 for creating and processing rating requests.

FIG. 3 shows a flowchart of an example process 300 for creating and processing rating requests. For clarity of presentation, the description that follows generally describes process 300 in the context of FIG. 1. However, it will be understood that the process 300 may be performed, for example, by any other suitable system, environment, software, and hardware, or a combination of systems, environments, software, and hardware as appropriate.

The process 300 includes processing and operations that occur, for example, in a mediation system 302 and a processing system 304. For example, the mediation system 302 can collect and store call detail records 306 that are to be provided to the processing system 304 for processing. Call detail records 306, for example, can be records that include information for individual phone calls and/or other billable or non-billable customer activities, such as in the customer's phone plan. For example, call detail records 306 can be the remote data records 132 of an external system 130. In some implementations, the process 300 can support (or support interfacing with) at least one customer relationship management (CRM) system, e.g., that may also generate consumption items and/or billable items. Example CRM-related consumption items can include credit memos that are created from a CRM front-end for call center agents and consumption items that are created for use in customer self-service (e.g., a charge for creation of an intermediate bill). In some implementations, billable items or consumption items can be sent by middleware systems and/or by other third-party or legacy systems.

Call detail records 306, once they reach the processing system 304, can become consumption items 308 that are collected by the processing system 304. For example, the consumption items 308 are data records to be processed by the processing system 304, such as for billing, invoicing, reporting or other purposes. In addition to including information from call detail records 306, the consumption items 308 can include consumption items that are created manually (e.g., manually captured items 310) and rating requests 312. For example, rating requests 312 can be created as described below with respect to FIG. 4.

The processing system 304 can collect selected consumption items, build rating groups, and send the consumption items for each group to a rating module 313 which can be assigned in a rating group configuration. A rating group determination 314, for example, can determine which consumption items 308 are rated (or unrated) and which ones need to be rated (or unrated). Example components of rating module 313 include the rating function for convergent invoicing 318, which can provide a direct derivation of billable items 324 using consumption items 308. In another example, a rating activation module 316 can call existing web services for activating contracts for a given date and to provide consumption items for a rating in convergent charging 320. For example, the rating activation module 316 can activate a contract if activation has not already been done before for the given time period, e.g., based on instructions in a rating request 312 associated with a rating group of consumption items. As a result, recurring components defined in a charge are triggered if their execution date has been reached, and billable items are sent to convergent invoicing 318 for further processing with a subsequent bulk loading run 322. With this, billable items 324 needed for billing 326 are processed (e.g., for a particular billing period). For the processing system 304 to be able to process rated and unrated consumption items in this way, triggering is to occur at the right moment of the bill cycle. For example, a new transaction, in the form of a rating request 312, is created and inserted by the processing system 304 as a consumption item 308 for the creation of the rating requests according to the cycle of the contract. In some implementations, an invoicing activity 329 can produce invoicing documents 330 using information from at least billing 326.

Figure 4:
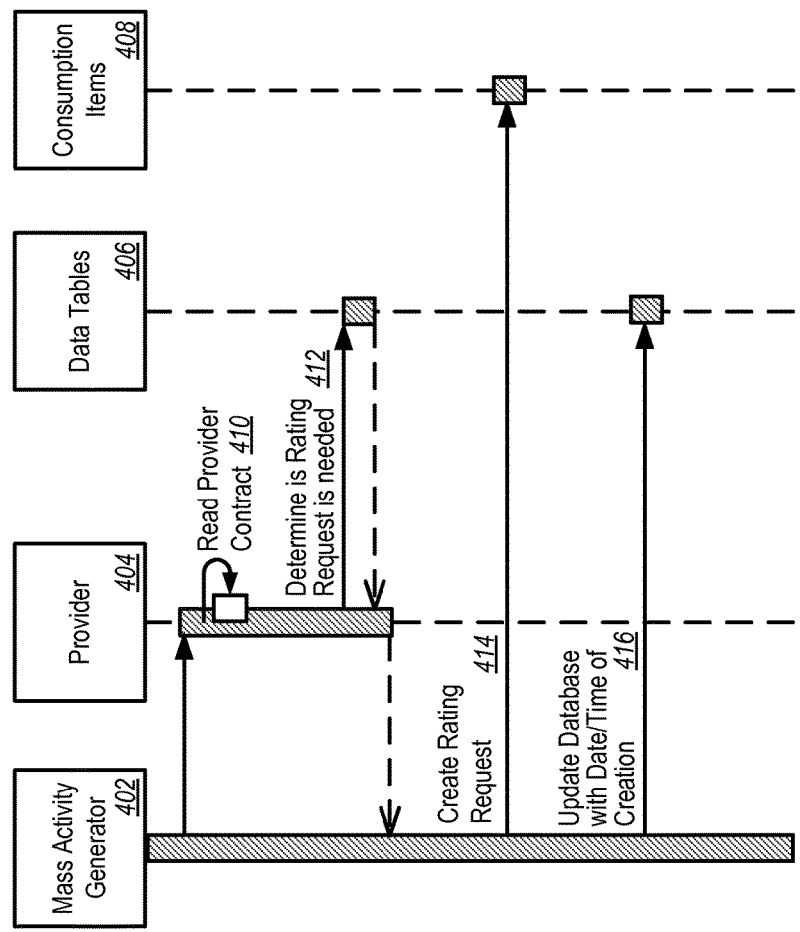
FIG. 4 shows a swim lane diagram of an example process 400 for creating rating requests.

FIG. 4 shows a swim lane diagram of an example process 400 for creating rating requests. For example, rating requests can be tied to, and be created for, particular billing cycles for particular customers or accounts. Each rating request that is created in the process 400, for example, can serve as a "dummy" consumption item that, instead of containing information (e.g., a phone call detail record) to be processed, includes instructions that indicate how a group of consumption items are to be processed. For example, the instructions can indicate that the consumption items are to be processed in a certain way and as a group for a particular customer and time period. In some implementations, multiple rating requests can be initiated by a mass activity generator 402 which can use provider 404 information (e.g., contract information on a per customer basis) to customize settings in a particular rating request for the customer (e.g., based on the customer's phone plan or other contract). The process 400 can use data tables 406 (e.g., to control processing) and create rating requests to be used as consumption items 408. The process 400 includes processes and processing associated with elements 402-408.

For example, rating request creation can be initiated by the mass activity generator 402. In some implementations, the mass activity generator 402 can include a main module for generating rating requests for a large group of customers. Initiating the creation of rating requests can occur at month-end, at the end of a group of customers' billing cycles, as one-time events, or in other situations. For example, for a mass activity in which multiple rating requests are to be generated, the mass activity generator 402 can read information from a database table that identifies which rating requests (e.g., period or scheduled) have been created and which ones need to be created. For example, the database tables can indicate that a request has already been created for a customer, e.g., in a certain period. The mass activity generator 402 can continue generating rating requests, for example, until unprocessed periods are processed and the desired data are created and added to a historical database table to indicate which rating requests were created and when. Consumption items can be created for each rating request, e.g., one consumption item per customer (or account), per period, as described in the following example operations.

At 410, for example, a provider contract associated with the customer/account is read, e.g., using contract information provided by the provider 404. The contract information can indicate, for example, how transactions (e.g., call detail records) are to be handled for the customer/account. For example, the contract that the customer has with the provider 404 can indicate that the first 500 minutes of calls are free, or included, in the calling plan for that customer. The contract may also indicate that call minutes exceeding 500 minutes are to be charged a flat rate. Other contracts for other customers, for example, can indicate that each call is to be charged according to a scheduled rate, e.g., based on length of call. Other contracts can include information that indicates how text messages, data downloads, and/or other consumption items are to be charged.

At 412, for example, a determination is made as to whether a rating request is needed for processing the consumption items associated with the contract, e.g., based on information in the contract. For example, if the contract stipulates that charges are simply to be processed based on usage (e.g., for a flat fee), then no rating request is necessary, as the process 400 can process the records as they exist. However, if the contract stipulates some kind of a usage plan limit, then it can be determined that a rating request is needed. In some instances, the determination may be a simple determination as to whether the rating request for a particular period has been generated, with minimal information associated with the reason for the creation of the rating request provided.

At 414, for example, the rating request is created. For example, if the contract stipulates a flat fee for 500 minutes (with per-minute overage charge for exceeding the limit), then the rating request can indicate those details. The rating request can indicate, for example, to "bill the customer X dollars for up to 500 minutes, and Y cents per minute for calls exceeding 500 minutes." In some implementations, the rating request that is created can be inserted into the consumption items 408, as another consumption item.

At 416, for example, a data table 406 (or some other database entry) is updated with the date and time that the rating request was added to the consumption items 408. For example, the data table 406 can serve as an updated history table that keeps track of rating requests that have been created, e.g., on a customer/account, time period basis.

The preceding figures and accompanying description illustrate example processes and computer implementable techniques. But example environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, example environment 100 may use processes with additional, fewer and/or different operations, as long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any implementation or on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

What is claimed is:

1. A computer-implemented method for processing data records, comprising:
   identifying, by a hardware processor, a provider contract associated with a particular account;
   in response to determining that the identified provider contract is associated with a periodic activity, creating, by the hardware processor, a rating request associated with the particular account based on the identified provider contract, the rating request representing a placeholder consumption item without specific account-related detail records and including a first instruction for processing at least one other consumption item associated with the particular account for a period of time associated with the periodic activity, the rating request further including a second instruction for triggering an action corresponding to the determined periodic activity at an external system to automatically generate the at least one other consumption item associated with the particular account;
   adding, by the hardware processor, the rating request associated with the particular account to an automated queue of consumption items for processing;
   processing, by the hardware processor, the added rating request associated with the particular account from the automated queue of consumption items, wherein processing the added rating request includes:
      transmitting a message to the external system for triggering the action corresponding to the determined periodic activity at the external system, wherein triggering the action at the external system includes initiating execution of a web service at the external system based on the second instruction in the rating request, the execution of the web service causing generation of at least one new or modified consumption item associated with the particular account at the external system;
      receiving, by the hardware processor and from the external system, the at least one new or modified consumption item; and
      adding, by the hardware processor, the at least one new or modified consumption item to the automated queue of consumption items, wherein the at least one new or modified consumption item are added after the added rating request in the automated queue of consumption items; and
   processing, by the hardware processor, the at least one new or modified consumption item associated with the particular account from the automated queue of consumption items based on the first instruction in the rating request.

2. The method of claim 1, wherein a consumption item is a call detail record related to a call or a message.

3. The method of claim 1, wherein identifying the provider contract associated with the particular account is performed in response to a mass activity, wherein the mass activity is performed for a plurality of provider contracts or accounts.

4. The method of claim 3, wherein the mass activity is performed once in a billing cycle.

5. The method of claim 1, wherein processing consumption items includes processing consumption items by rating groups.

6. The method of claim 5, wherein rating requests are associated with a rating request-specific rating group.

7. The method of claim 1, wherein triggering the action at the external system further includes verifying information in the consumption items or accessing additional information associated with at least one of the consumption items or the particular account, wherein the triggered action results in at least one modified consumption item.

8. The method of claim 1, wherein executing the web service includes connecting the system to contract activation of the particular account.

9. A computer-readable media, the computer-readable media comprising computer-readable instructions embodied on tangible, non-transitory media, the instructions operable when executed by at least one computer to:
   identify a provider contract associated with a particular account;
   in response to determining that the identified provider contract is associated with a periodic activity, create a rating request associated with the particular account based on the identified provider contract, the rating request representing a placeholder consumption item without specific account-related detail records and including a first instruction for processing at least one other consumption item associated with the particular account for a period of time associated with the periodic activity, the rating request further including a second instruction for triggering an action corresponding to the determined periodic activity at an external system to automatically generate the at least one other consumption item associated with the particular account;
   add the rating request associated with the particular account to an automated queue of consumption items for processing;
   process the added rating request associated with the particular account from the automated queue of consumption items, wherein processing the added rating request includes:
      transmitting a message to the external system for triggering the action corresponding to the determined periodic activity at the external system, wherein triggering the action at the external system includes initiating execution of a web service at the external system based on the second instruction in the rating request, the execution of the web service causing generation of at least one new or modified consumption item associated with the particular account at the external system;
      receiving, from the external system, the at least one new or modified consumption item; and
      adding the at least one new or modified consumption item to the automated queue of consumption items, wherein the at least one new or modified consumption item are added after the added rating request in the automated queue of consumption items; and
   process the at least one new or modified consumption item associated with the particular account from the automated queue of consumption items based on the first instruction in the rating request.

10. The computer-readable media of claim 9, wherein a consumption item is a call detail record related to a call or a message.

11. The computer-readable media of claim 9, wherein identifying the provider contract associated with the particular account is performed in response to a mass activity, wherein the mass activity is performed for a plurality of provider contracts or accounts.

12. The computer-readable media of claim 11, wherein the mass activity is performed once in a billing cycle.

13. The computer-readable media of claim 9, wherein processing consumption items includes processing consumption items by rating groups.

14. The computer-readable media of claim 13, wherein rating requests are associated with a rating request-specific rating group.

15. A computer system, comprising:
   memory operable to store content, including static and dynamic content; and
   at least one hardware processor interoperably coupled to the memory and operable to perform instructions to:
      identify a provider contract associated with a particular account;
      in response to determining that the identified provider contract is associated with a periodic activity, create a rating request associated with the particular account based on the identified provider contract, the rating request representing a placeholder consumption item without specific account-related detail records and including a first instruction for processing at least one other consumption item associated with the particular account for a period of time associated with the periodic activity, the rating request further including a second instruction for triggering an action corresponding to the determined periodic activity at an external system to automatically generate the at least one other consumption item associated with the particular account;
      add the rating request associated with the particular account to an automated queue of consumption items for processing;
      process the added rating request associated with the particular account from the automated queue of consumption items, wherein processing the added rating request includes:
         transmitting a message to the external system for triggering the action corresponding to the determined periodic activity at the external system, wherein triggering the action at the external system includes initiating execution of a web service at the external system based on the second instruction in the rating request, the execution of the web service causing generation of at least one new or modified consumption item associated with the particular account at the external system;
         receiving, from the external system, the at least one new or modified consumption item; and
         adding the at least one new or modified consumption item to the automated queue of consumption items, wherein the at least one new or modified consumption item are added after the added rating request in the automated queue of consumption items; and
      process the at least one new or modified consumption item associated with the particular account from the automated queue of consumption items based on the first instruction in the rating request.

16. The computer system of claim 15, wherein a consumption item is a detail record related to call or a message.

17. The computer system of claim 15, wherein identifying the provider contract associated with the particular account is performed in response to a mass activity, wherein the mass activity is performed for a plurality of provider contracts or accounts.

18. The computer system of claim 17, wherein the mass activity is performed once in a billing cycle.

19. The computer system of claim 15, wherein processing consumption items includes processing consumption items by rating groups.

* * * * *